Patented June 6, 1939

2,161,407

UNITED STATES PATENT OFFICE 2,161,407

STABLE SOLUTIONS OF SULPHANILAMIDE

Walter G. Christiansen, Glen Ridge, N. J., assignor to E. R. Squibb & Sons, New York, N. Y., a corporation of New York No Drawing. Application August 26, 1937, Serial No. 161,021

6 Claims. (Cl. 167—65)

This invention relates to the administration of sulphanilamide as a therapeutic agent.

Sulphanilamide (p-amino-benzene-sulphonamide) is a valuable therapeutic agent in the treatment of streptococcal infections and the like. Because of its limited water-solubility (0.8 g. per 100 cc. water at 25° C.) and the large doses required, the effectiveness of the administration of sulphanilamide by injection of its aqueous solution is limited, and it is therefore generally administered orally, in the form of tablets. Attempts have been made to provide injectable preparations yielding sulphanilamide, as by converting it into water-soluble p-sulphamidophenylazo compounds; however, such preparations have given poor results, since only a small proportion thereof is reduced in the body to sulphanilamide, most of the azo compound being eliminated unchanged. Though obviously desirable, no effective injectable solutions of sulphanilamide have heretofore been disclosed.

It is an object of this invention to provide stable solutions of sulphanilamide which may be effectively administered by injection.

In application Ser. No. 161,020, filed August 26, 1937, it has been shown that oxy-aliphatic alcohols are good solvents for sulphanilamide, and that the solutions are suitable for injection. In application Ser. No. 161,025, filed August 26, 1937 it has been shown that the solutions of sulphanilamide in hydroxy-aliphatic ethers may be improved by the addition of water. However, all these solutions, which are initially substantially colorless, develop a yellow color on aging. It has been found that the addition of a small quantity of a substance of the group consisting of alkali-metal formaldehyde sulphoxylates and alkali-metal formaldehyde bisulphites substantially prevents or corrects the coloration of these solutions.

The effective oxy-aliphatic alcohol solvents include, inter alia, the following glycols and hydroxy-aliphatic ethers: ethylene glycol, diethylene glycol, triethylene glycol, propylene glycol, glycerol monoethyl ether, ethylene glycol monoethyl ether, and diethylene glycol monoethyl ether. Of these, the hydroxy-aliphatic ethers, such as diethylene glycol, are the best solvents for sulphanilamide. However, the solutions in hydroxy-aliphatic ethers are so viscous as to offer considerable resistance to passage through a hypodermic needle. This defect may be remedied by diluting the solution with water.

The following tabulation shows the concentrations of sulphanilamide obtainable with these solvents, in grams of sulphanilamide per 100 cc. of a solution stable at room temperature:

| Solvent | Concentration |
|---|---|
| Ethylene glycol | 10.0 |
| Propylene glycol | 7.5 |
| Diethylene glycol | 17.0 |
| Triethylene glycol | 20.0 |
| Ethylene glycol monoethyl ether | 20.0 |
| a-Glycerol monoethyl ether | 20.0 |
| Diethylene glycol monoethyl ether | 25.0 |
| Diethylene glycol, 2 parts / Water, 1 part | 10.0 |
| Triethylene glycol, 2 parts / Water, 1 part | 16.0 |
| Diethylene glycol monoethyl ether, 2 parts / Water, 1 part | 16.0 |

The development of color in these solutions is presumably due to the formation of a colored Schiff base by reaction of the sulphanilamide with aldehydic materials present in the solvent. Solvents such as triethylene glycol cannot economically be purified to the extent that they give a negative result in sensitive aldehyde tests. The decolorizing action of sodium formaldehyde sulphoxylate, for example, must therefore be due to its reduction of the aldehydic material or to its reaction with the Schiff base to form a colorless compound. Accordingly, other substances which similarly reduce aldehydic materials or form colorless reaction products with Schiff bases may be used in place of the alkali-metal formaldehyde sulphoxylates and alkali-metal formaldehyde bisulphites to stabilize these solutions.

A stable solution, suitable for injection may be prepared, for example, by mixing 2 parts triethylene glycol with 1 part water, and adding sufficient sodium formaldehyde sulphoxylate to give a concentration of approximately 2 g. per liter; after standing overnight, this solution is used to dissolve sulphanilamide, a sufficient quantity of solvent being used to yield with 10 g. of sulphanilamide 100 cc. of solution; and the solution is then filtered, and packaged in ampules.

The following detailed example is illustrative of the invention: 330 cc. of triethylene glycol is deoxygenated by alternate evacuation and breaking of the vacuum with nitrogen four times. Then 165 cc. of double-distilled water, which has been boiled to deoxygenate it and cooled under nitrogen, is mixed with the glycol, and the deoxygenation treatment repeated. Thereupon 1 g. of pure dry sodium formaldehyde sulphoxylate is dissolved in this mixture by warming slightly, and after standing overnight, 51.5 g. of sulphanilamide is dissolved therein by warming slightly. The solution is then vacuum-filtered while being protected from exposure to air. The bright, clear, almost colorless solution is filled into ampules, and sealed under a nitrogen atmosphere. The solution develops a very slight yellowish tint, which may be reduced by warming slightly (e. g. to about 50° C.); and, being sterile, the solution requires no special sterilization treatment.

The invention may be variously otherwise embodied within the scope of the appended claims.

I claim:

1. A stable therapeutic preparation essentially comprising sulphanilamide, an oxy-aliphatic alcohol, and a small proportion of a substance of the group consisting of alkali-metal formaldehyde sulphoxylates and alkali-metal formaldehyde bisulphites.

2. A stable therapeutic preparation essentially comprising sulphanilamide, an oxy-aliphatic alcohol, and a small proportion of sodium formaldehyde sulphoxylate.

3. A stable therapeutic preparation essentially comprising sulphanilamide, a hydroxy-aliphatic ether, and a small proportion of sodium formaldehyde sulphoxylate.

4. A stable therapeutic preparation essentially comprising sulphanilamide, a hydroxy-aliphatic ether, water, and a small proportion of sodium formaldehyde sulphoxylate.

5. A stable therapeutic preparation essentially comprising sulphanilamide, triethylene glycol, water, and a small proportion of sodium formaldehyde sulphoxylate.

6. A stable therapeutic preparation consisting of a solution of sulphanilamide in a mixture of about 2 parts triethylene glycol and about 1 part water and containing 0.2 g. sodium formaldehyde sulphoxylate per 100 cc. of solution.

WALTER G. CHRISTIANSEN.